United States Patent Office 3,172,890
Patented Mar. 9, 1965

3,172,890
NOVEL ULTRASHORT-ACTING THIOBARBITURATES
Wilbur J. Doran, Indianapolis, Ind., assignor to Eli Lilly and Company, Indianapolis, Ind., a corporation of Indiana
No Drawing. Filed June 4, 1962, Ser. No. 199,607
2 Claims. (Cl. 260—260)

This invention relates to novel thiobarbituric acids.

In the past, a number of thiobarbituric acids have been prepared which had a short half-life upon administration to a mammal by the parenteral route. The most promising of these compounds has long been marketed as an intravenous anesthetic with the generic name of thiopental, which compound also finds use as a "truth-serum." Use of these short-lived thiobarbituric acids as anesthetics, however, has had a serious drawback in that there is an unduly prolonged period of recovery from the effects of the anesthetic; i.e., the time between awakening from the anesthetic and attainment of a substantially normal physical state is much longer than desirable.

It is an object of this invention to provide thiobarbituric acids which are ultrashort-acting when employed as intravenous anesthetics and and yet are free from the undesirable side effects and long recovery period characteristic of the thiobarbituric acids employed in the past.

The compounds provided by this invention can be represented by the following formula:

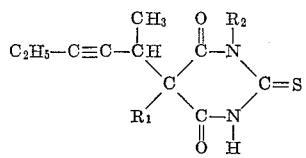

wherein $R_1$ is ethyl or allyl and $R_2$ is hydrogen or methyl. Also included within the scope of this invention are the nontoxic cationic salts of the thiobarbituric acids represented by the above formula. By the term "nontoxic cationic salts" is meant those salts formed with cations of metals or metalloids which are themselves not poisonous to an animal organism, such cations including those of the alkaline earth and alkali metal groups of the Periodic Table as well as metalloid cations such as the ammonium and substituted ammonium ions.

The thiobarbituric acids represented by the above formula are white crystalline solids. They are readily soluble in most organic solvents, but are best recrystallized from the more polar organic solvents such as the lower aliphatic alcohols.

The compounds of this invention can be prepared according to the following reaction scheme:

REACTION SCHEME 1

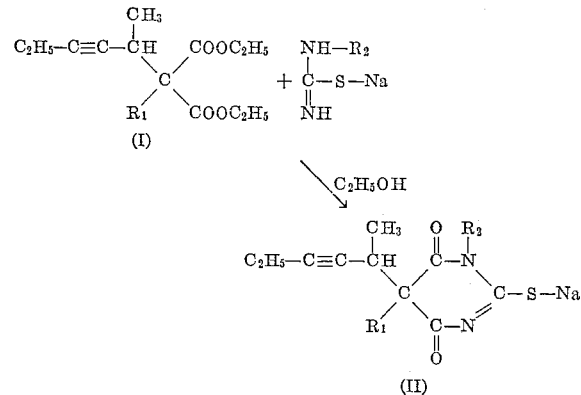

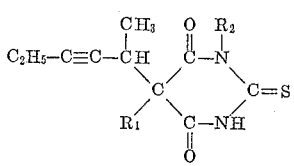

wherein $R_1$ and $R_2$ have the same significance as above. According to the above reaction scheme, a 5-(1-methyl-2-pentynyl)-5-substituted malonic ester (I) is reacted with the sodium salt of thiourea or methylthiourea in alcoholic solution to yield the sodium salt of the desired thiobarbituric acid (II). Neutralization of the sodium salt with acid produces the free thiobarbituric acid (III) which can be isolated by filtration.

An alternate synthetic process is available for the preparation of the compounds of this invention, and this alternate process is set forth in Reaction Scheme 2 below:

REACTION SCHEME 2

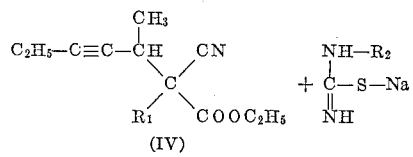

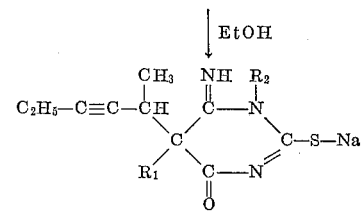

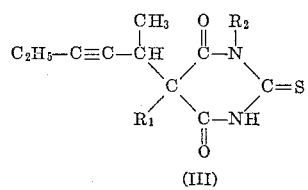

wherein $R_1$ and $R_2$ have the same significance as above. According to Reaction Scheme 2 above, a suitable substituted ethylcyanoacetate (IV) is reacted with the sodium salt of methylthiourea or thiourea to give the corresponding iminothiobarbituric acid (V). The iminothiobarbiturate is in turn hydrolyzed to the thiobarbituric acid (III) by the action of aqueous acid.

The starting materials employed in either of the above schemes are readily prepared by methods well-known to the art, as for example, by the alkylation of the sodium salt of malonic ester or of ethyl cyanoacetate with 2-bromo-3-hexyne followed by a further alkylation of the resulting compound with allyl bromide or ethyl bromide.

The cationic salts of compounds represented by Formula III above are prepared by dissolving the thiobarbituric acid in ethanol or other suitable solvent, adding an equivalent amount of base, such as sodium hydroxide, calcium hydroxide, magnesium hydroxide, sodium ethylate, potassium ethylate, ammonium hydroxide, trimethylammonium hydroxide and the like, and then removing the solvents by evaporation in vacuo, preferably using freeze-drying techniques, leaving the cationic salt of the thiobarbituric acid as an amorphous residue. Extreme care must be exercised in handling the cationic salts of thiobarbituric acids since they are known to be hygroscopic in the non-crystalline state.

Compounds represented by III above, in which $R_2$ is methyl, have two asymmetric carbon atoms and are thus capable of existing in two racemic modifications which are labeled α-dl and β-dl, with the α-dl appellation ordinarily being given to the higher melting, or less soluble, racemate. In general the α-dl racemate shows fewer undesirable side effects than the β-dl racemate upon administration to a mammal. The preferred method of synthesizing the α-dl racemic mixture is outlined in Reaction Scheme 2 above in which an iminothiobarbiturate is prepared and then converted by hydrolysis to the thiobarbituric acid itself. This synthetic procedure yields only the α-dl racemate. Reaction Scheme 1, on the other hand, yields substantial quantities of both the α-dl and β-dl racemates.

The compounds provided by this invention, and in particular those compounds represented by III in which $R_2$ is methyl, are excellent ultrashort-acting anesthetics when administered to mammals by the intravenous route. Furthermore, animals to whom one of these compounds has been administered as an intravenous anesthetic, have a smooth and also very rapid recovery from the effects of the drug. For example, when a median anesthetic dose of either 1-methyl-5-allyl-5-(1-methyl-2-pentynyl)-2-thiobarbituric acid or the corresponding 5-ethyl derivative is administered to a dog by the intravenous route, the dog usually awakens about 20 minutes after the injection. The dog quickly rises to his feet, is briefly ataxic, and then assumes normal behavior and locomotion. In other words, at the end of approximately 30 minutes after administration of the anesthesia, the dog to whom the anesthetic had been administered is entirely normal. This rapid recovery from the drug is unlike the typical recovery pattern produced by other thiobarbiturates.

The compounds of this invention are customarily employed for therapeutic purposes in the form of a physiologically compatible solution of a nontoxic cationic salt, usually the sodium salt, of the thiobarbituric acid. Thus, by way of example, for therapeutic usage, 15 g. of 1-methyl - 5 - ethyl-5-(1-methyl-2-pentynyl)-2-thiobarbituric acid are dissolved in a dilute aqueous sodium hydroxide solution containing the exact amount of sodium hydroxide necessary to neutralize the thiobarbituric acid. The resulting solution is divided equally among fifteen 100 ml. ampoules, and the contents are freeze dried, thus leaving about 1 g. of the thiobarbiturate in each ampoule. The ampoule is then sealed off. Just prior to use, the ampoule is opened and its contents mixed with 100 ml. of a diluent, as for example sterile water, 5 percent dextrose or an isotonic sodium chloride solution. The resulting 1 percent solution is injected intravenously into a dog at the rate of about 6 ml. per minute until anesthesia is obtained. The anesthesia can then be maintained by intermittent injection of a solution of the same strength or by using a 0.2 percent solution in a constant drip infusion method.

The anesthetic procedure illustrated above is exemplary of the use of the compounds of this invention in anesthetizing mammals. The process finds particular use in veterinary medicine. For example, when a minor surgical procedure is to be carried out in a veterinarian's office, the subject animal can be anesthetized by the intravenous injection of a 1 percent solution of the sodium salt of 1-methyl - 5 - ethyl-5-(1-methyl-2-pentynyl)-2-thiobarbituric acid. The surgical procedure or wound dressing or whatever, can then be carried out while the animal is under the effects of the anesthetic. Then a few minutes after the surgical procedure is completed, the animal wakes and is ready to be returned home with his or her owner. The customary observation period ranging from one hour to overnight is usually totally unnecessary.

The preparation of the compounds of this invention is illustrated by the following specific examples:

Example 1

PREPARATION OF 5-ALLYL-5-(1-METHYL-2-PENTYNYL)-2-THIOBARBITURIC ACID

Six and nine-tenths grams of sodium were dissolved in 105 ml. of anhydrous ethanol thus forming sodium ethylate. 11.4 g. of thiourea were added to the sodium ethylate solution. Next, 28 g. of diethyl allyl (1-methyl-2-pentynyl) malonate were added and the resulting reaction mixture was heated to refluxing temperatures for about 8.5 hours. The ethanol was then removed by distillation and the residue, comprising sodium 5-allyl-5-(1-methyl-2-pentynyl)-2-thiobarbiturate, was dissolved in water. The aqueous solution was extracted three times with ether and the ether extracts were discarded. The alkaline aqueous solution was then acidified with 10 percent hydrochloric acid, thus forming 5-allyl-5-(1-methyl-2-pentynyl)-2-thiobarbituric acid. The free acid was insoluble in the acidic layer and separated as an oil which solidified on cooling. The solid acid was separated by filtration and the precipitate was recrystallized three times from aqueous ethanol. 5-allyl-5-(1-methyl-2-pentynyl)-2-thiobarbituric acid thus prepared melted at about 131–133° C.

*Analysis.*—Calc.: N, 10.60. Found: N, 10.55.

The sodium salt of 5-allyl-5-(1-methyl-2-pentynyl)-2-thiobarbituric acid was prepared by dissolving 15 g. of the free acid in a mixture containing 100 ml. of water and 4.55 g. of 50 percent (by weight) aqueous sodium hydroxide. The pH of the resulting solution was 11.35. The sodium salt was isolated by freeze drying the alkaline aqueous solution.

Example 2

PREPARATION OF 5-ETHYL-5-(1-METHYL-2-PENTYNYL)-2-THIOBARBITURIC ACID

Following the procedure of Example 1, the sodium salt of thiourea was condensed with diethyl ethyl (1-methyl-2-pentynyl)-malonate to give sodium 5-ethyl-5-(1-methyl-2-pentynyl)-2-thiobarbiturate. The sodium salt was converted to the free acid which melted at about 135–137° C. after a three-fold recrystallization from aqueous ethanol.

*Analysis.*—Calc.: N, 11.10. Found: N, 11.27.

The sodium salt of 5-ethyl-5-(1-methyl-2-pentynyl)-2-thiobarbituric acid was prepared by the method of Example 1.

Example 3

PREPARATION OF α-DL-1-METHYL-5-ETHYL-5-(1-METHYL-2-PENTYNYL)-2-THIOBARBITURIC ACID

Eighteen grams of sodium were dissolved in 360 ml. of anhydrous ethanol thus forming sodium ethylate. 152 g. of ethyl (1-methyl-2-pentynyl) cyanoacetate were added to the solution, thus forming the corresponding sodium salt. About 50 percent of the ethanol was removed by distillation in vacuo. 94 g. of ethyl bromide were added to the reaction mixture over a period of 40 minutes, thus forming ethyl ethyl (1-methyl-2-pentynyl) cyanoacetate. The reaction mixture was heated at refluxing temperature for about 2 hours. The residual alcohol was then removed by distillation in vacuo. Two hundred ml. of water were added. The water solution was separated and discarded and the ester was dried and distilled. Ethyl ethyl (1-methyl-2-pentynyl) cyanoacetate thus prepared distilled in the range of 107–110° C. at a pressure of about 4 mm. of Hg; $n_D^{25} = 1.449$.

About 3.5 g. of sodium were dissolved in 72 ml. of isopropanol, thus forming sodium isopropylate. 13.5 g. of methyl thiourea were added to the solution thus forming the sodium salt of methyl thiourea. 26.8 g. of ethyl ethyl (1-methyl-2-pentynyl) cyanoacetate were added and the resulting reaction mixture was heated to refluxing temperatures for about six hours. The isopropanol was removed by distillation in vacuo and the residue, comprising the sodium salt of α-dl-1-methyl-5-ethyl-6 - imino - 5 - (1 - methyl - 2 - pentynyl) - 2 - thiobarbituric acid, was dissolved in water. The alkaline aqueous solution was neutralized with acetic acid, thus causing the free thiobarbituric acid to precipitate as a gummy precipitate. The precipitate was separated by filtration and was washed with water. Maceration of the precipitate with hexane caused it to crystallize. α-dl-1-methyl-5-ethyl-6-imino-5-(1-methyl-2-pentynyl)-2-thiobarbituric acid thus prepared melted at about 89–93° C. after a two-fold recrystallization from aqueous ethanol followed by a single recrystallization from isopropanol.

Fifteen grams of α-dl-1-methyl-5-ethyl-6-imino-5-(1-methyl-2-pentynyl)-2-thiobarbituric acid were stirred with a mixture of 9.6 ml. of 12 N hydrochloric acid and 100 ml. of water at about 80° C. for about 75 minutes. α - dl - 1 - methyl - 5 - ethyl - 5 - (1 - methyl - 2 - pentynyl)-2-thiobarbituric acid thus formed separated from the hydrolysis mixture upon cooling and melted at about 97–99° C. after a three-fold recrystallization from aqueous ethanol.

*Analysis.*—Calc.: C, 58.62; H, 6.81; N, 10.52. Found: C, 58.71; H, 6.87; N, 10.37.

The sodium salt of α-dl-1-methyl-5-ethyl-5-(1-methyl-2-pentynyl)-2-thiobarbituric acid was prepared according to the method of Example 1.

Example 4

α-DL-1-METHYL-5-ALLYL-5-(1-METHYL-2-PENTYNYL)-2-THIOBARBITURIC ACID

α - dl - 1 - methyl - 5 - allyl - 6 - imino - 5 - (1 - methyl-2-pentynyl)-2-thiobarbituric acid was prepared by reacting ethyl allyl (1-methyl-2-pentynyl) cyanoacetate with the sodium salt of methyl thiourea. The iminothiobarbituric acid was hydrolyzed to yield α-dl-1-methyl-5-allyl-5 - (1 - methyl - 2 - pentynyl) - 2 - thiobarbituric acid which melted at about 55–57° C. after successive recrystallizations from pentane, aqueous methanol, and aqueous ethanol.

*Analysis.*—Calc.: C, 60.40; H, 6.52; N, 10.07. Found: C, 60.57; H, 6.45; N, 10.06.

The sodium salt of α-dl-1-methyl-5-allyl-5-(1-methyl-2-pentynyl)2-thiobarbituric acid was prepared by the method of Example 1.

I claim:
1. A compound selected from the group consisting of a thiobarbituric acid and its nontoxic cationic salts, said thiobarbituric acid being represented by the following formula:

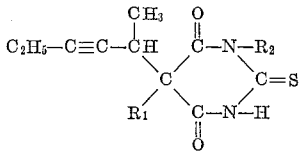

wherein $R_1$ is a member of the group consisting of ethyl and allyl and $R_2$ is a member of the group consisting of hydrogen and methyl.

2. 1 - methyl - 5 - ethyl - 5 - (1 - methyl - 2 - pentynyl)-2-thiobarbituric acid.

References Cited in the file of this patent
UNITED STATES PATENTS

| | | |
|---|---|---|
| 2,538,322 | Opie et al. | Jan. 16, 1951 |
| 2,725,380 | Cope | Nov. 29, 1955 |
| 2,872,448 | Doran | Feb. 3, 1959 |

OTHER REFERENCES

Burger: Medicinal Chemistry, pages 363–368 (1960).
Conant: The Chemistry of Organic Compounds, pages 264–265 (1939).
Lowy et al.: An Introduction to Organic Chemistry, 6th edition, page 213 (1945).
Physicians' Desk Reference, page 623 (1961).